Sept. 2, 1958  W. A. ESCHENBURG  2,850,054
TILTING ARBOR SAW
Filed July 9, 1956  5 Sheets-Sheet 1

INVENTOR.
William A. Eschenburg
BY
Cromwell, Greist + Warden
Attys.

Sept. 2, 1958 W. A. ESCHENBURG 2,850,054
TILTING ARBOR SAW
Filed July 9, 1956 5 Sheets-Sheet 2

INVENTOR.
William A. Eschenburg
BY
Cromwell, Greist & Warden
Attys.

Sept. 2, 1958   W. A. ESCHENBURG   2,850,054
TILTING ARBOR SAW
Filed July 9, 1956   5 Sheets-Sheet 3
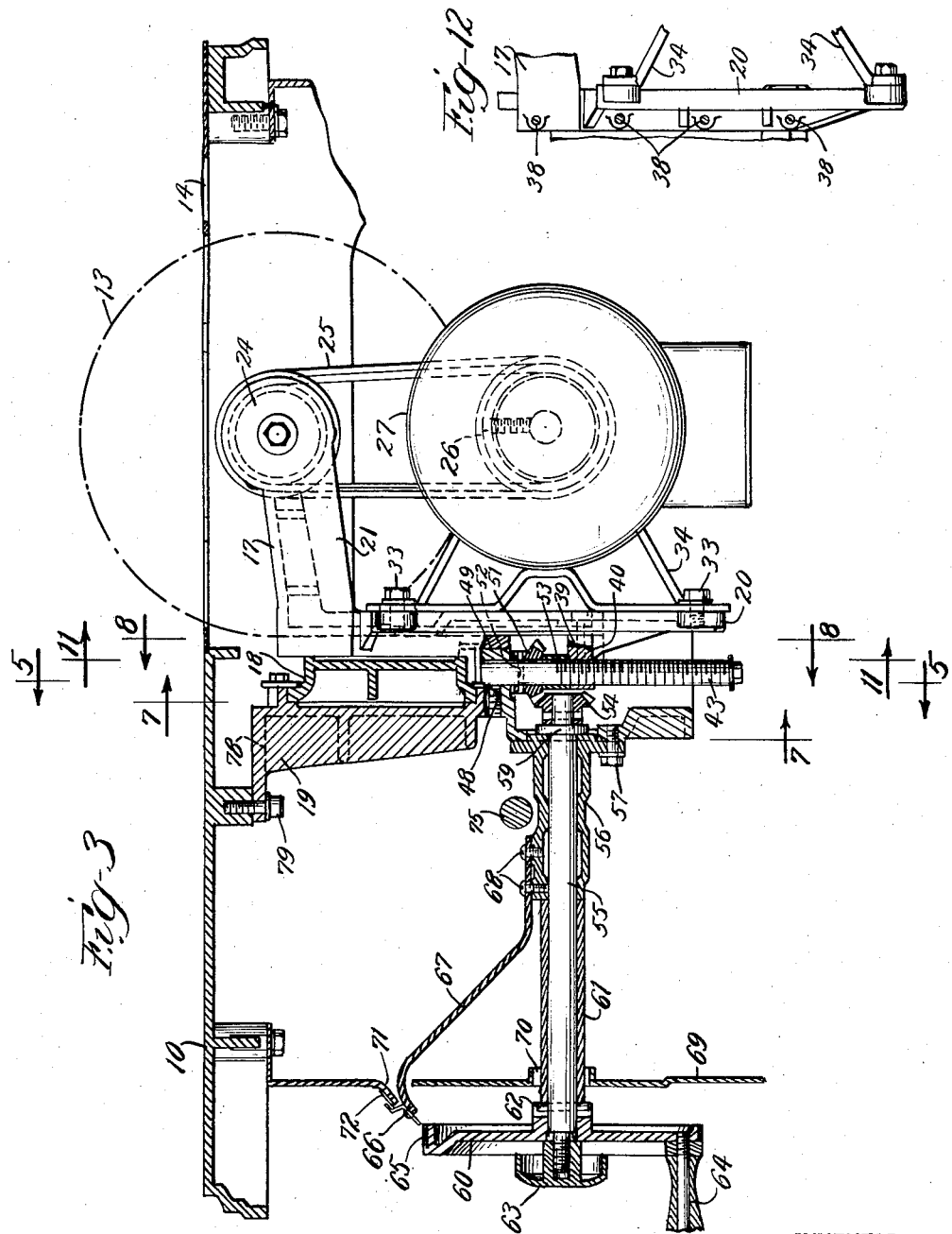
INVENTOR.
William A. Eschenburg
BY
Cromwell, Greist + Warden
Attys.

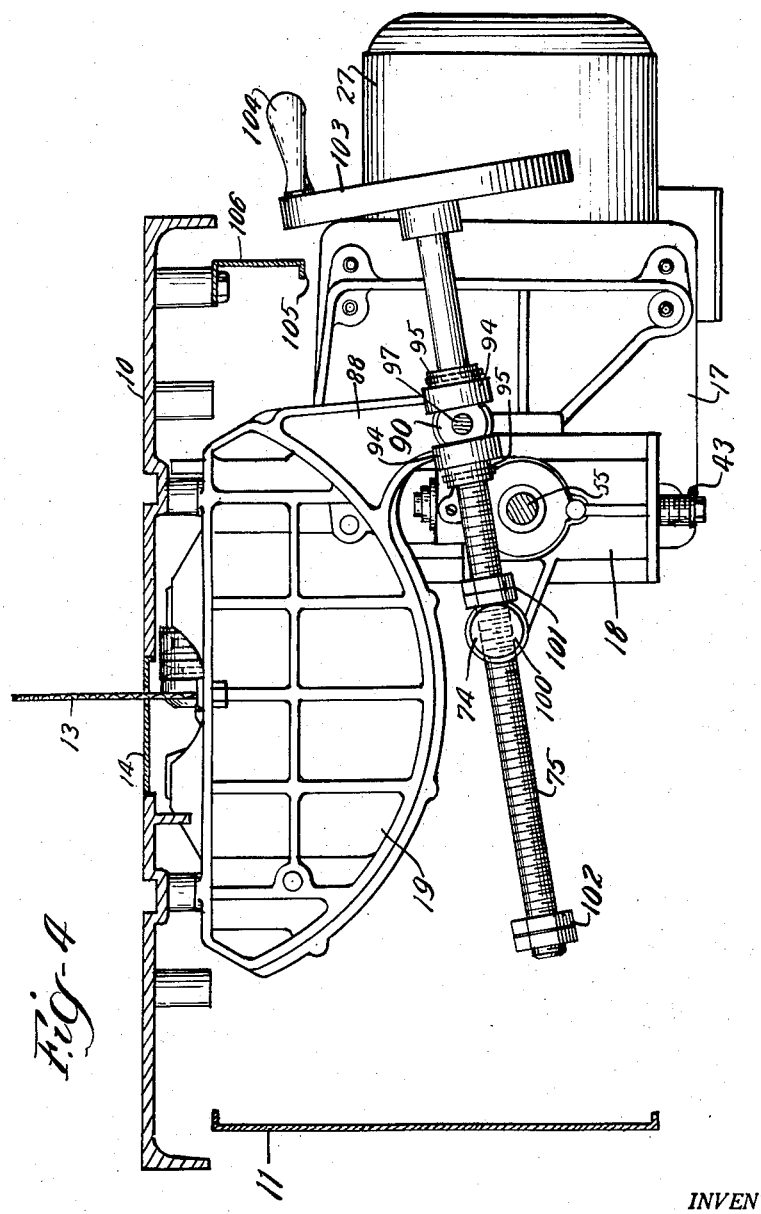

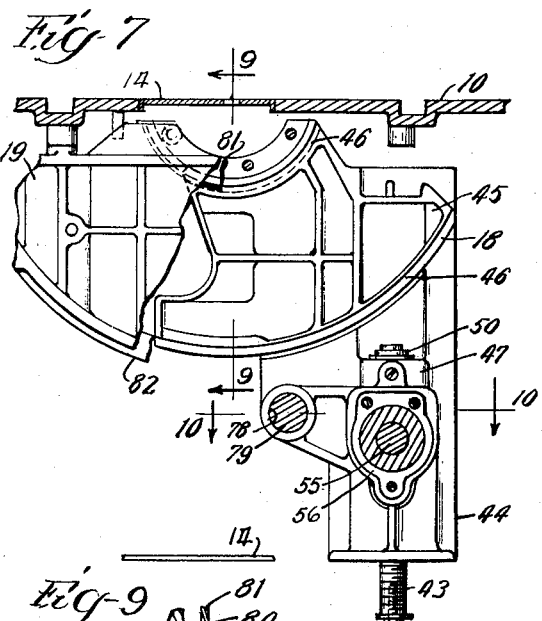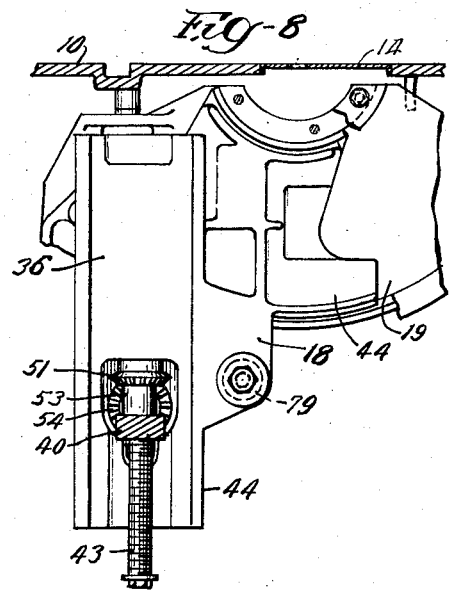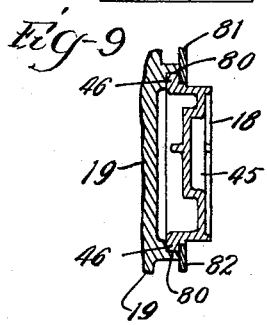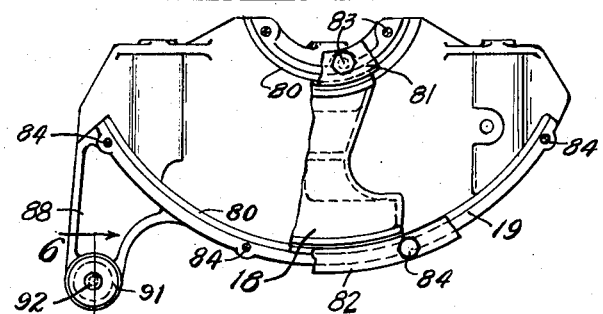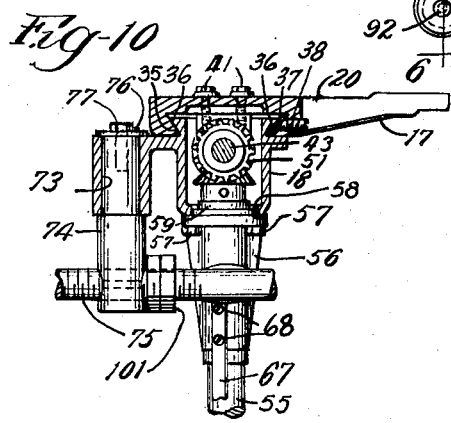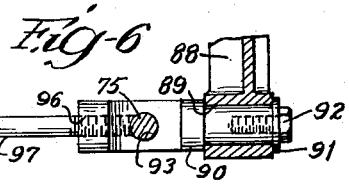
INVENTOR.
William A Eschenburg
BY
Cromwell, Greist & Warden
Attys.

United States Patent Office 2,850,054
Patented Sept. 2, 1958

2,850,054

TILTING ARBOR SAW

William A. Eschenburg, South Beloit, Ill., assignor to Yates-American Machine Company, Beloit, Wis., a corporation of Delaware Application July 9, 1956, Serial No. 596,479

5 Claims. (Cl. 143—36)

This invention relates to power driven tools and is more particularly concerned with improvements in a machine having a rotatably mounted arbor adapted to support a cutting tool for performing wood or metal working operations.

It is a general object of the invention to provide a power driven tool which comprises a rotatable tool carrying arbor, a work supporting frame structure including a work table over which the work is moved for engagement with the tool, and a mechanism for supporting the arbor in adjustable relation beneath the work table, which mechanism is a self-contained unitary assembly with a minimum number of parts so arranged that the arbor may be raised and lowered or tilted without any bending or misalignment of the mechanism.

It is a more specific object of the invention to provide a material working machine comprising a power driven arbor adapted to support a cutting tool, a supporting bracket on which the arbor is journalled, a trunnion bracket having a sliding connection with the arbor supporting bracket, a trunnion support bracket, an arcuate track and trackway connection between the trunnion bracket and its support bracket, and a supporting structure for the brackets which includes a work table having a tool slot in the work supporting surface thereof, the trunnion support bracket being secured in fixed depending relation beneath the work table and operating means being provided for connecting the brackets for movement relative to each other to adjust the arbor for positioning the tool in the slot in either normal or tilted relation to the horizontal surface of the work table.

It is a further object of the invention to provide a wood working machine comprising a supporting frame having a work table which is provided with an elongate slot for receiving a cutting tool, a trunnion support member mounted in depending relation beneath the work table and having on its inner face a semi-circular trackway which extends in a plane transeverse of the tool slot, a trunnion bracket having on its outer face a cooperating semi-circular track which is mounted in the trackway of the trunnion support member for swinging movement of the trunnion bracket about an axis extending in the plane of the work surface of the work table and longitudinally of the tool slot therein, an inverted L-shaped arbor bracket having a dovetail track on a depending leg thereof which is received in vertical sliding relation in a dovetail guideway on the inner face of the trunnion bracket, and a tool carrying arbor which is journalled in the arbor bracket and which is adapted to position the tool in operative relation in the tool slot.

These and other objects and advantages will be apparent from a consideration of the preferred form of the cutting machine which is shown by way of illustration in the accompanying drawings wherein:

Fig. 3 is a longitudinal section taken on the line 3—3 of Fig. 2;

Fig. 4 is a transverse section taken on the line 4—4 of Fig. 2;

Fig. 5 is a partial transverse section taken on the line 5—5 of Fig. 3, with portions broken away;

Fig. 6 is a section taken on the line 6—6 of Fig. 5, with portions broken away;

Fig. 7 is a partial transverse section, taken on the line 7—7 of Fig. 3, with portions broken away;

Fig. 8 is a partial transverse section, taken on the line 8—8 of Fig. 3, with portions broken away;

Fig. 9 is a cross section, taken on the line 9—9 of Fig. 7, with portions broken away;

Fig. 10 is a cross section taken on the line 10—10 of Fig. 7, with portions broken away;

Fig. 11 (Sheet 1) is a partial transverse section taken on the line 11—11 of Fig. 3, with portions broken away; and Fig. 12 (Sheet 3) is a fragmentary elevation taken on the line 12—12 of Fig. 11.

Figure 1:
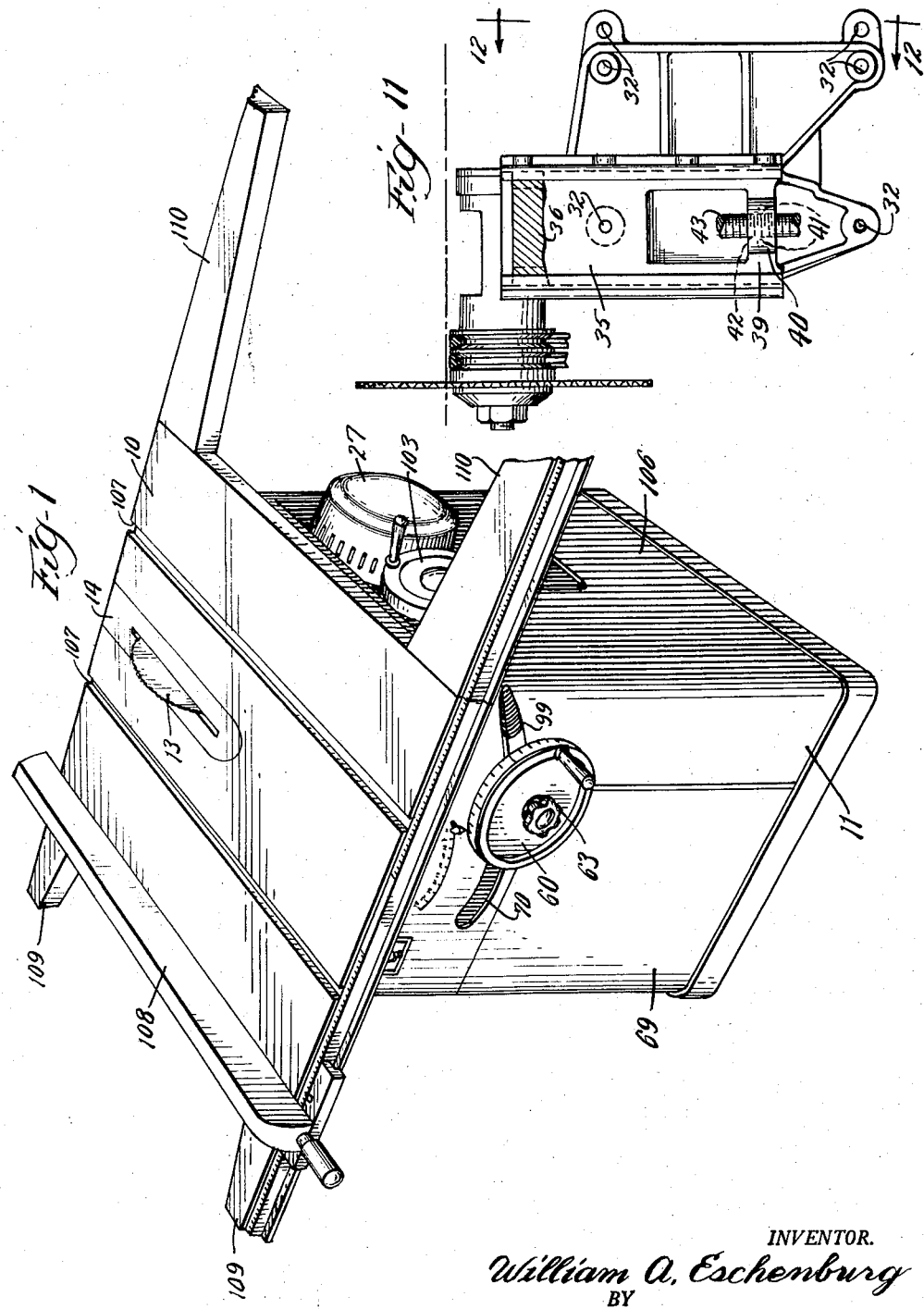
Fig. 1 is a perspective view of a cabinet type circular saw which incorporates therein the principal features of the invention.
Figure 2:
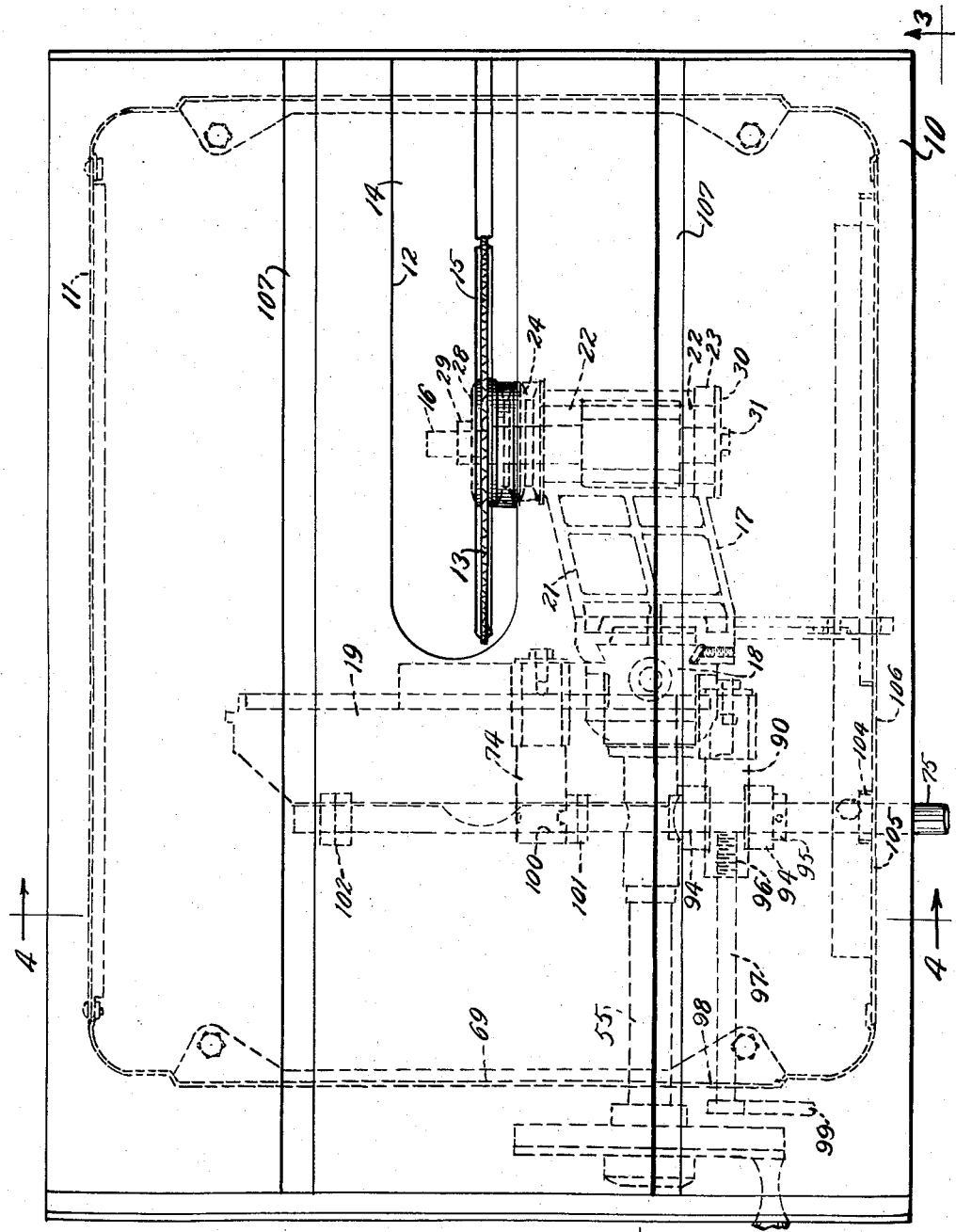
Fig. 2 is a plan view of the saw.

Referring to the drawings, there is illustrated a power driven table or cabinet type saw which has incorporated therein mechanism embodying the principal features of the invention. The illustrated machine comprises a generally rectangular work supporting table 10 which is supported on and forms the top of an upright cabinet 11, the front and one side wall of the latter being apertured as required to accommodate the control members and other projecting portions of the blade supporting and driving mechanism which it encloses. The work table 10 has an elongate aperture 12 extending longitudinally of the top surface and adjacent the rear edge thereof to provide access to the saw blade or other cutting tool 13 and an insert 14 is provided for the aperture 12 which has a tool accommodating slot 15 therein. The blade or other tool 13 is mounted on a power driven arbor 16 which is supported for vertical and tilting movement by mechanism suspended beneath the work table 10.

The mechanism for supporting and driving the arbor 16 comprises an arbor bracket 17 on which the arbor is journalled for rotation about an axis extending transversely of the plane of the blade 13, a tilting guide bracket 18 with which the arbor bracket 17 is slidably connected for vertical adjustment relative to the work table 10, and a support bracket 19 for the tilting guide bracket 18 which is connected in fixed depending relation beneath the work table 10 and on which the tilting guide bracket 18 is mounted for arcuate sliding movement to tilt the blade about an axis extending longitudinally of the table and in the cutting plane of the blade 13.

The arbor bracket 17 (Figs. 2, 3, 10, 11 and 12) is in the form of a metal casting which is generally L-shaped and which is arranged in inverted relation with the long leg 20 thereof depending in a vertical plane extending transversely of the work table 10. The short upper leg 21 thereof extends in a generally horizontal direction toward the rear of the work table 10 and beneath the aperture 12 therein. The tool carrying arbor 16 is mounted in a pair of transversely spaced bearings indicated at 22 which are seated in the opposite ends of an arbor housing 23 formed on the rear end of leg member 21. The arbor 16 carries a pulley 24 which is connected by double V-belts 25 with the drive pulley 26 on a drive motor 27 also carried on the arbor support 17. A suitable tool clamping washer 28 and nut 29 are provided on the tool carrying end of the arbor 16 while the other end carries a cap plate 30 which is held thereon by a cap screw 31. The leg 21 of the arbor bracket 17 is angled inwardly somewhat from the vertical leg 20 toward the aperture 12 in the horizontal plane when the arbor bracket 17 is in the non-tilted or vertical position so that the blade 13 is aligned vertically with slot 14 and rotates without interference from any of its supporting mechanism.

The vertical leg 20 of the arbor bracket 17 is wider than the leg 21 and is provided on its inner or rearwardly facing vertical surface with suitable threaded apertures 32 for receiving stud bolts 33 which secure thereon the base 34 of the motor 27. The leg 20 is provided on its outer or forwardly facing vertical surface with a relatively wide dovetail groove formation 35 (Figs. 10 and 11) which is adapted to receive in sliding relation cooperating dovetailed ways 36 on the rearwardly facing vertical surface of the tilting guide bracket 18 and a take-up gib 37 which is held in position by set screws 38 and which keeps the sliding action smooth and accurate without play or looseness. An apertured cross web or boss 39 is provided at the lower end of the dovetail groove 35 for attaching thereto a hoist nut 40 which is secured thereon by stud bolts 41 and which has a vertically extending threaded bore 42 (Fig. 11) for receiving in threaded relation therein a hoist screw 43 which is mounted on the tilting guide bracket 18.

The tilting guide bracket 18 (Figs. 3 and 7 to 10) is arranged in a plane extending generally transverse of the work table 10 and is in the form of a metal casting with a vertically extending section 44 and a generally arcuate section 45, the former extending in depending relation at one side or end of the latter. The inner face of the vertically extending section 44 has a dovetail way formation 36 which is received in the dovetail groove 35 on the arbor bracket 17 and cooperates therewith to provide a vertical sliding connection between the arbor bracket 17 and the tilting guide bracket 18. The outer face of the arcuate section 45 has an arcuate track formation 46 formed thereon for connecting the same in arcuate sliding relation with the tilting guide supporting bracket 19. A horizontal web section 47 (Fig. 7) intermediate the top and bottom edges of the vertical section 44 extends between the two vertical faces of the bracket and is apertured at 48 (Fig. 3) to receive the vertically extending hoist screw 43. The hoist screw 43 is journalled in a sleeve bearing or bushing 49 in the aperture 48 and is held in position by a washer and retaining ring 50 (Fig. 7) on the end of the screw. A miter gear 51 is secured on the screw 43 by a pin 52 (Fig. 3) at the lower end of the bushing 49. The threaded portion of the screw 43 is engaged in the hoist nut 40 and a spacer sleeve 53 is arranged on the screw 43 adjacent the gear 51 which provides a stop limiting the uppermost position of the nut 40, thereby determining the uppermost position of the arbor 16 relative to the work table 10.

The miter gear 51 is engaged with a cooperating gear 54 on the inner end of a hoist control shaft 55. The hoist control shaft 55 extends horizontally in the lengthwise direction of the machine and at right angles to the transverse plane in which the tilting guide bracket 18 moves. It is supported in an elongate bearing bracket 56 which is flanged at its inner end and attached by stud bolts 57 to an apertured portion of the vertical section 44 of the tilting guide bracket 18. The inner end of the bearing bracket 56 extends into the aperture 58 (Fig. 10) provided in the tilting guide bracket and the inner end of the shaft 55 extends through the aperture and receives a thrust bearing 59 which bears against the inner end of the bearing bracket 56. The hoist shaft 55 extends at the other end thereof to a point at the front end of the machine and is provided with an operating hand wheel 60 having a hub portion which abuts against the outer end of the spacer sleeve 61 and which has a cross slot to receive a cross pin 62 secured in the shaft 55. The hand wheel 60 is locked in position on the end of the shaft 55 by a hand knob 63 which is in threaded engagement with a reduced end portion of the shaft 55. The wheel 60 has a handle member 64 and carries on its periphery a hoist scale 65. A double pointer 66 is mounted on the end of a bracket 67 which is formed of a bent strap and which has its inner end secured by screws 68 to the shaft bracket 56. The front wall 60 of the cabinet 11 is provided with arcuate apertures or slots 70 and 71 to accommodate the arcuate movement of the hoist control shaft 55 and the pointer support bracket 67. A tilt scale 72 is carried on a bent over portion of the cabinet wall 69 which defines the upper edge of the slot 71.

The tilting guide bracket 18 has a bearing aperture 73 (Fig. 10) in a laterally extending web portion adjacent the aperture 27 which receives the end of a swivel 74 (Fig. 4 also) for connecting the tilting guide bracket 18 to the tilt control shaft 75. The swivel 74 is held in the aperture 73 by a washer or cap plate 76 and a cap screw 77 on the inner end thereof.

The tilting guide support bracket 19 (Figs. 2 to 6) is arranged in a transverse plane and is in the form of a metal casting of generally arcuate shape which has an apertured top flange 78 secured in fixed relation by stud bolts 79 (Fig. 3), to depending apertured bosses provided on the bottom face of the work table 10. The inner vertical face of the bracket 19 is recessed to provide upper and lower arcuate grooves 80 having cooperating plates 81 and 82 which are secured to the bracket 19 by stud bolts 83 and 84 adjacent the upper and lower grooves 80 and cooperate therewith to form guideways for receiving the arcuate track formation 46 on the tilting guide bracket 18. The bracket 19 includes a laterally extending swivel supporting portion 88 (Figs. 4 and 5) depending at one side thereof which is bored to provide a bearing aperture 89 (Fig. 6) for receiving a swivel member 90. The swivel 90 is held in the aperture 89 by a washer or cap plate 91 and a cap screw 92. The swivel member 90 has a cross bore 93 in which the tilt control shaft 75 is mounted and the control shaft is provided with a pair of thrust bearings 94 (Fig. 4) which are held in position thereon between the collars 95, each of the latter being pinned to the shaft 75. A threaded axial bore 96 (Fig. 6) is provided in the end of the swivel member 90 to receive the inner end of a relatively long cap screw 97 (Fig. 2) which extends at its other end through a suitable aperture 98 in the front wall 69 of the cabinet 11 and is provided with an operating lever handle 99 for rotating the same to lock the tilt shaft 75 against rotational movement, when desired. The tilt shaft 75 extends in threaded relation in a cross bore 100 (Figs. 2 and 4) in the swivel member 74 which projects from the tilting guide bracket 18 and connects the same for arcuate movement in response to rotational movement of the tilt shaft 75. Stop nuts 101 and 102 on the shaft 75 limit the tilting movement. An operating wheel 103 having a handle 104 is secured to the outer end of the shaft 75 which extends through an aperture 105 (Figs. 2 and 4) provided in the side wall 106 of the cabinet 11.

The table 10 (Fig. 1) is grooved longitudinally at 107 on opposite sides of the tool slot 14 for receiving thereon a miter gauge (not shown). A guide or rip fence 108 is provided which is supported at the front and rear edges for movement across the table surface with its vertical faces disposed in planes which are parallel to the plane of operation of the blade 15 in the position shown in Figs. 1 to 4. Preferably the table 10 is provided with pairs of extension arms 109 and 110 connected to the opposite side edges thereof.

In using the tool, the arbor supporting bracket 17 is adjusted vertically by manual rotation of the shaft 55 which causes rotation of the hoist screw 43 through the miter gear connection therewith and resultant movement of the hoist nut 40 in the vertical direction, thus raising or lowering the arbor 16 and the blade 13 as desired.

When a miter cut is desired, the tilt control shaft 75 is rotated to swing the tilting guide bracket 18 on the fixed support bracket 19 about a longitudinal axis extending in the plane of the top or work surface of the table 10 and through the tool slot 15, the guide members 46 moving smoothly in the guideways 80 and permitting accurate tilting adjustment. The saw blade 13, is, of course, merely representative of the several cutting tools which may be attached to the end of the arbor 16. Any other arbor supported cutting tool may be substituted with corresponding changes in the tool slot 15 and the insert 14. Also, the arbor 16 may be connected directly to the motor shaft for a direct drive by appropriate changes in the provisions on the arbor bracket 17 for supporting the drive motor 27. The entire mechanism may, of course, be incorporated in a bench type tool by modification of the supporting cabinet structure.

While particular details of construction and specific materials have been referred to in describing the form of the machine illustrated, it will be understood that other details of construction and other materials may be resorted to within the spirit of the invention.

I claim:

1. In a wood working machine, a horizontal work table having a saw blade accommodating work slot, a single trunnion support member mounted in depending relation beneath the work slot and having a semi-circular double trackway formation arranged in a vertical plane extending transversely of the work slot, a plate-like trunnion bracket having a cooperating semi-circular double track formation on one face thereof which is mounted in the trackway formation on said trunnion support member for swinging movement about a horizontal axis extending in the plane of the work surface of said work table and longitudinally of the work slot, said trunnion bracket having a dovetail guideway formation on the opposite face thereof, an inverted generally L-shaped supporting bracket extending normal to the plane of the trunnion bracket and having a dovetail track formation on the vertical leg thereof which is slidably positioned in the guideway formation on the trunnion bracket, a saw arbor journalled on the horizontal leg of said L-shaped bracket with the axis thereof extending transversely of the plane of said supporting bracket, a driving motor for said saw arbor supported on said L-shaped bracket a driving connection between said motor and said saw arbor, an adjusting screw mounted between the L-shaped bracket and the trunnion bracket, an operating shaft extending in a generally horizontal direction beneath the lower edge of the trunnion support and having a gear connection with said adjusting screw, and a tilt adjusting shaft pivotally supported on said trunnion support member and having a screw threaded connection with an adjusting nut which is pivotally mounted on said trunnion bracket.

2. In a wood working machine, a supporting frame, a work table on said frame having a saw blade accommodating work slot, a trunnion support member mounted on said table in depending relation beneath the work slot and having on its inner face a semi-circular double track guideway extending in a plane transversely of the work slot and normal to the work supporting top surface of said work table, a plate like trunnion bracket having on its outer face a cooperating semi-circular double track formation mounted in the guideway of said trunnion support member for tilting movement about an axis extending in the plane of the top surface of said work table and longitudinally of the work slot, said trunnion bracket having a plate-like extension projecting below the lower edge of said trunnion support member, said trunnion bracket and its extension having a dovetail guideway on the inner face thereof, an inverted L-shaped supporting bracket extending in a plane generally normal to the plane of said trunnion backet and having a dovetail track on the outside face of the vertical leg thereof which is slidably positioned in the guideway of the trunnion bracket, a saw arbor journalled in the horizontal leg of said L-shaped bracket with the axis thereof extending transversely of said L-shaped bracket, a driving motor for said saw arbor supported on said L-shaped bracket a driving connection between said motor and said saw arbor, an adjusting screw mounted between the vertical leg of said L-shaped bracket and the trunnion bracket for adjusting the same relative to each other, an operating shaft journalled in said trunnion bracket and extending in a generally horizontal direction beneath the lower edge of said trunnion support member and having a bevel gear connection at its inner end with said vertical adjusting screw, and a tilt adjusting shaft rotatably and pivotally supported in a bearing bracket on the lower edge of said trunnion support member and having a screw threaded connection with an adjusting nut which is pivotally mounted in the extension on said trunnion bracket.

3. In a wood working machine, a supporting frame, a work table having a saw blade accommodating work slot, a single trunnion support member mounted in depending relation beneath the work slot and having semi-circular double trackways arranged in a vertical plane extending transversely of the work slot, a plate-like trunnion bracket having a cooperating semi-circular double track formation on one face thereof mounted in the trackways of said trunnion support member for swinging movement about an axis extending in the plane of the work surface of said work table and longitudinally of the work slot, said trunnion bracket having an extension projecting below the lower edge of said trunnion support member, said trunnion bracket and its extension having a dovetail guideway formation on the face thereof opposite said semi-circular track formation, an inverted L-shaped supporting bracket extending in a plane generally normal to said trunnion bracket and having a dovetail track on the inner edge of the vertical leg thereof which is slidably positioned in the guideway of the trunnion bracket, a saw arbor journalled in the horizontal leg of said L-shaped bracket with its axis extending transversely thereof, a driving motor for said saw arbor supported on said L-shaped bracket and having a driving connection with said saw arbor, an adjusting screw mounted between the vertical leg of said L-shaped bracket and said trunnion bracket, an operating shaft journalled in said trunnion bracket and extending in a generally horizontal direction beneath the lower edge of said trunnion support member, a driving connection between said operating shaft and said adjusting screw, and a tilt adjusting shaft pivotally supported in a bearing bracket extending below the lower edge of said trunnion support member and having a screw threaded connection with an adjusting nut which is pivotally mounted in the extension on said trunnion bracket.

4. In a wood working machine, a supporting frame, a work table having a saw blade accommodating work slot, a trunnion support member mounted in depending relation beneath the work slot and having on its inner face a semi-circular double trackway formation which is in a plane extending transversely of the work slot, a trunnion bracket having on its outer face a cooperating semi-circular track formation which is mounted in the trackway of said trunnion support member for swinging movement about an axis extending in the plane of the work surface of said work table and logitudinally of the work slot, said trunnion bracket having an extension projecting below the lower edge of said trunnion support member, said trunnion bracket and its extension having a dovetail guideway on the inner face thereof, an inverted L-shaped supporting bracket extending generally normal to the inner face of said trunnion bracket and its extension and having a dovetail track on the outside face of the vertical leg thereof which is slidably positioned in said guideway, a saw arbor journalled on the horizontal leg of said L-shaped bracket with its axis of rotation extending in a plane which is transverse of said work slot, a driving motor for said saw arbor supported on said L-shaped bracket and having a driving connection with said saw arbor, an adjusting screw mounted in a housing forming space between said L-shaped bracket and said trunnion bracket, an operating shaft journalled in said trunnion bracket and extending in a generally horizontal direction beneath said lower edge of the trunnion support member, bevel gears connecting said operating shaft with said vertical screw, a tilt adjusting shaft pivotally supported in a bearing bracket extending below the lower edge of said trunnion support member and an adjusting nut which is pivotally connected to the extension on said trunnion bracket, said tilt adjusting shaft being connected in screw threaded relation with said adjusting nut.

5. In a material working machine having a supporting frame and a work table with a tool accommodating slot, a trunnion support member mounted in depending relation beneath the work slot and having on its inner face an arcuate trackway formation which is in a plane extending transversely of the tool slot, a trunnion bracket having on its outer face a cooperating arcuate track formation which is mounted in the trackway of said trunnion support member for swinging movement about an axis extending in the plane of the work surface of said work table and longitudinally of the tool slot, said trunnion bracket having a wing-like side extension, said trunnion bracket and its side extension having a dovetail guideway on the inner face thereof, an inverted generally L-shaped supporting bracket extending in a plane generally normal to the inner face of said trunnion bracket and its extension and having a dovetail track on the outside face of the vertical leg thereof which is slidably positioned in the guideway of the trunnion bracket, a tool supporting arbor rotatably mounted on the horizontal leg of said L-shaped bracket and extending in a plane which is transverse of said tool slot, a power drive for said arbor supported on said L-shaped bracket and having a driving connection with said arbor, an adjusting screw having an upper end journalled in said trunnion bracket and a lower end connected with a nut secured on the vertical leg of said L-shaped bracket, an operating shaft having its inner end journalled in said trunnion bracket, bevel gears connecting said operating shaft with said adjusting screw, a tilt adjusting shaft pivotally connected with said trunnion support member and said trunnion bracket, and an adjusting nut which is pivotally connected to said trunnion bracket, said tilt adjusting shaft being connected in screw threaded relation with said adjusting nut.

References Cited in the file of this patent
UNITED STATES PATENTS

| | | |
|---|---|---|
| 1,314,291 | Wallace | Aug. 26, 1919 |
| 1,372,374 | Taylor | Mar. 22, 1921 |
| 1,821,113 | Neighbour | Sept. 1, 1931 |
| 1,922,151 | Boice | Aug. 15, 1933 |
| 2,131,492 | Ocenasek | Sept. 27, 1938 |
| 2,261,696 | Ocenasek | Nov. 4, 1941 |
| 2,489,420 | Kirk et al. | Nov. 29, 1949 |
| 2,711,762 | Gaskell | June 28, 1955 |